Figure 1:
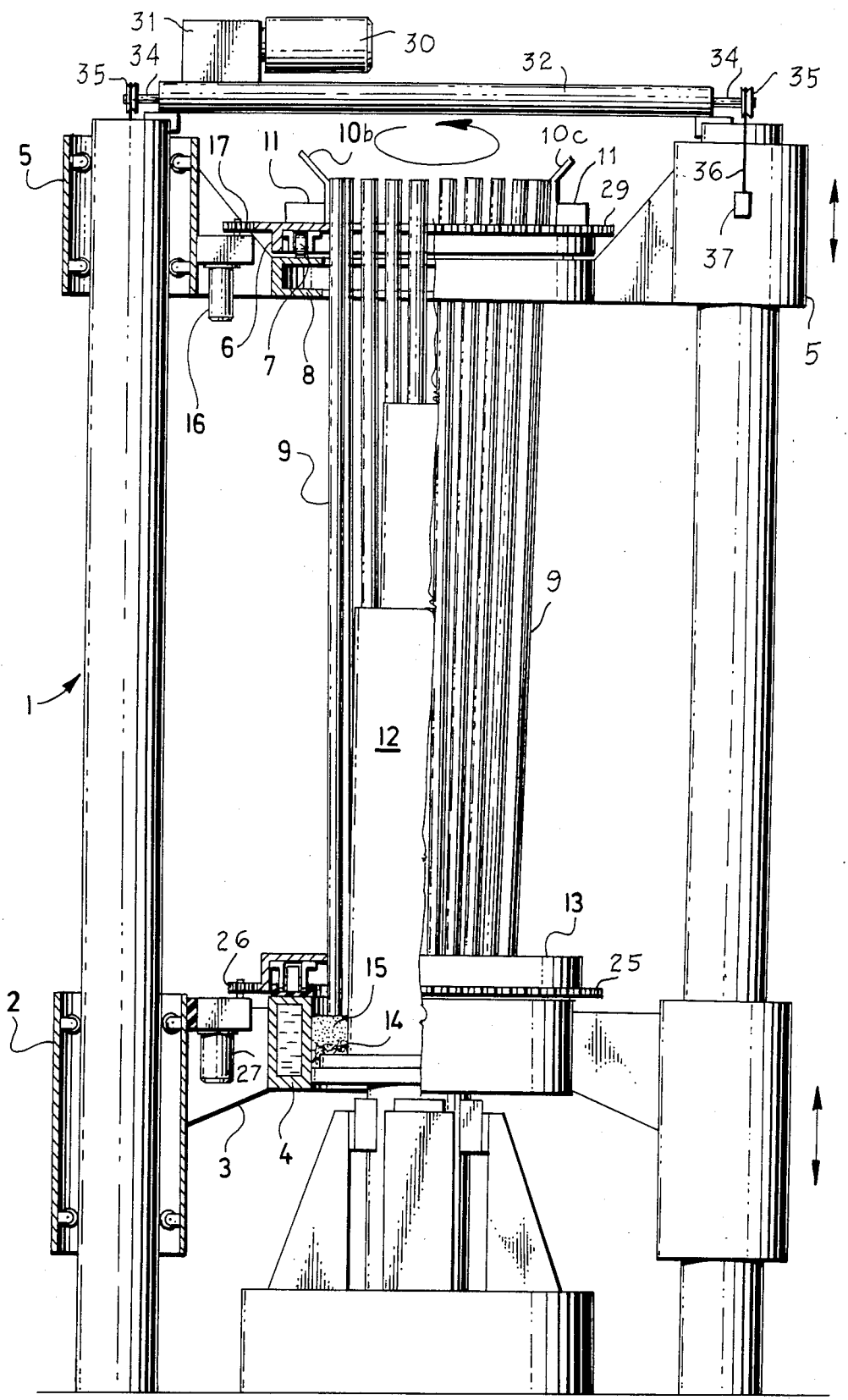

United States Patent [19]

Blaskovits et al.

[11] Patent Number: 4,707,581

[45] Date of Patent: Nov. 17, 1987

[54] APPARATUS FOR THE ELECTROSLAG SURFACING OF ROLLING MILL ROLLS

[75] Inventors: Pavol Blaskovits; Stefan Lesnak; Aloiz Martisik; Jan Zajac; Jan Slavkovsky; Ladislav Turiansky, all of Bratislava; Rudolf Levius, Ivanka pri Dunaji, all of Czechoslovakia

[73] Assignee: Vyskumny ustav zvaracsky, Bratislava, Czechoslovakia

[21] Appl. No.: 757,743

[22] Filed: Jul. 22, 1985

[30] Foreign Application Priority Data

Jul. 20, 1984 [CS] Czechoslovakia ............... 5584-84

[51] Int. Cl.$^4$ .................... B23K 25/00; B23K 9/04
[52] U.S. Cl. ............................ 219/73.11; 219/73.1
[58] Field of Search ................ 219/73.11, 73.1, 76.1

[56] References Cited

U.S. PATENT DOCUMENTS 3,139,505  6/1964  Kirschning ............... 219/73.1
4,373,128  2/1983  Asai et al. ............... 219/73.11

FOREIGN PATENT DOCUMENTS 47-35655   9/1972  Japan ................... 219/73.11
47-21348  10/1972  Japan ................... 219/73.11
51-38247   3/1976  Japan ................... 219/73.1

*Primary Examiner*—E. A. Goldberg
*Assistant Examiner*—Catherine M. Sigda

[57] ABSTRACT

Equipment for the electroslag surfacing of rolls. A roll to be surfaced is held in vertical position. One or more vertical supports are provided of which a first platform or lower carriage carrying a rotatable sleeve with an annular crystallizer surrounding the roll is located to permit vertical travel thereof, and an upper platform or upper carriage, carrying a swivel plate with bus bars for supplying generally vertically disposed welding electrodes with welding currents equipped with rollers on the bottom resting on a circular guiding path is provided, each electrode having a fixing mechanism with a support. A rotary mechanism for the guidance of welding electrodes into the weld gap is mounted on one or more upper sleeves, and is insulated from the crystallizer, while the bus bars are provided into three segments insulated from each other, each bus bar being connected with its respective phase of a three-phase current supply. A fixing mechanism and supports are placed on the inner perimeter of the swivel plate at the beginning of the welding operation; the welding electrodes are held in oblique position, tipped somewhat from the vertical, and by gradually melting down they approach a vertical position. This prevents short-circuiting between one or more welding electrodes and a roll having a body of considerable length along which the electrodes initially extend.

4 Claims, 3 Drawing Figures

APPARATUS FOR THE ELECTROSLAG SURFACING OF ROLLING MILL ROLLS

This invention relates to equipment for the electroslag surfacing of cylindrical or similar metallic surfaces, and is especially suitable for the surfacing of the working surfaces of rolling mill rolls.

Several devices for the electroslag surfacing of cylindrical or similar surfaces, especially the working surfaces of rolls, have been developed. In one such device, a roll to be surfaced is located with its longitudinal axis either vertical or horizontal. Devices of this type permit oscillatory movement of welding electrodes feeding into a pool of weld metal along a certain length of a circular path, with the axis of the roll to be surfaced located at its center. The main disadvantages of this device are irregular weld penetration depth into the roll being surfaced, non-homogeneity of the weld metal, and the complex state of stress in the roll surface can be considered as the main disadvantages of such prior equipment.

Another existing device for electroslag welding is designed in such a way that the welding electrodes are placed around the perimeter of the surface of the rotating body and remain in the same position during feeding, i.e. they do not make any movement except feed. The crystallizer is also steady and the roll being surfaced, placed with its longitudinal axis in a vertical direction, rotates around its axis. A disadvantage of this method is that solidified slag is deposited between the surface of the roll being treated and the fixed forming crystallizer; this causes excessive wearing of the crystallizer walls. Due to excessive friction between the surface of the roll being treated and the crystallizer, the roll often seizes in the crystallizer, resulting in deformation of the roll surface.

Other known devices consist of a load carrying structure, which bears a lower platform on which the crystallizer surrounding the metal roll being surfaced is mounted, and a second, upper platform on which the current supply and mechanisms for feeding of the electrodes into the weld pool are mounted. In the case in which the electrodes oscillate during electroslag surfacing, a swivel plate is located on the upper platform on which current supply mechanisms are mounted. A disadvantage of this equipment is that the swivel plate can make only an oscillatory movement, but cannot perform a complete rotary movement.

The disadvantages of the above-described prior art equipment for the electroslag surfacing of rolls are to a great extent obviated by the present invention. In accordance with the invention, one or more supports are provided on which a first platform or lower carriage carrying a sleeve with a crystallizer is located to permit vertical travel thereof. A second platform or upper carriage, carrying a swivel plate with bus bars for supplying welding electrodes is also provided. The electrodes are equipped with rollers on the bottom resting on a circular guiding path, each electrode having a fixing mechanism with a support. A rotary mechanism for the guidance of welding electrodes into the weld gap is mounted on one or more upper sleeves, and is insulated from the crystallizer, while the bus bars are divided into three segments insulated from each other, each bus bar being connected with its respective phase of a three-phase current supply.

The equipment for electroslag surfacing of rolls according to the invention permits the fixed guiding of consumable electrodes into the weld gap even with greater curvature tolerances of electrodes; a feature that is especially suitable with long electrodes.

At the beginning of the welding operation the welding electrodes are held in oblique position, tipped from the vertical, by a fixing mechanism and supports placed on the inner perimeter of the swivel plate. They approach a vertical position by gradually melting down, which prevents short-circuiting between one or more welding electrodes and a roll having a body of considerable length along which the electrodes initially extend.

The invention provides compensation for irregular penetration along the electrode swing path, which favorably effects the quality of the weld deposits.

Figure 2:
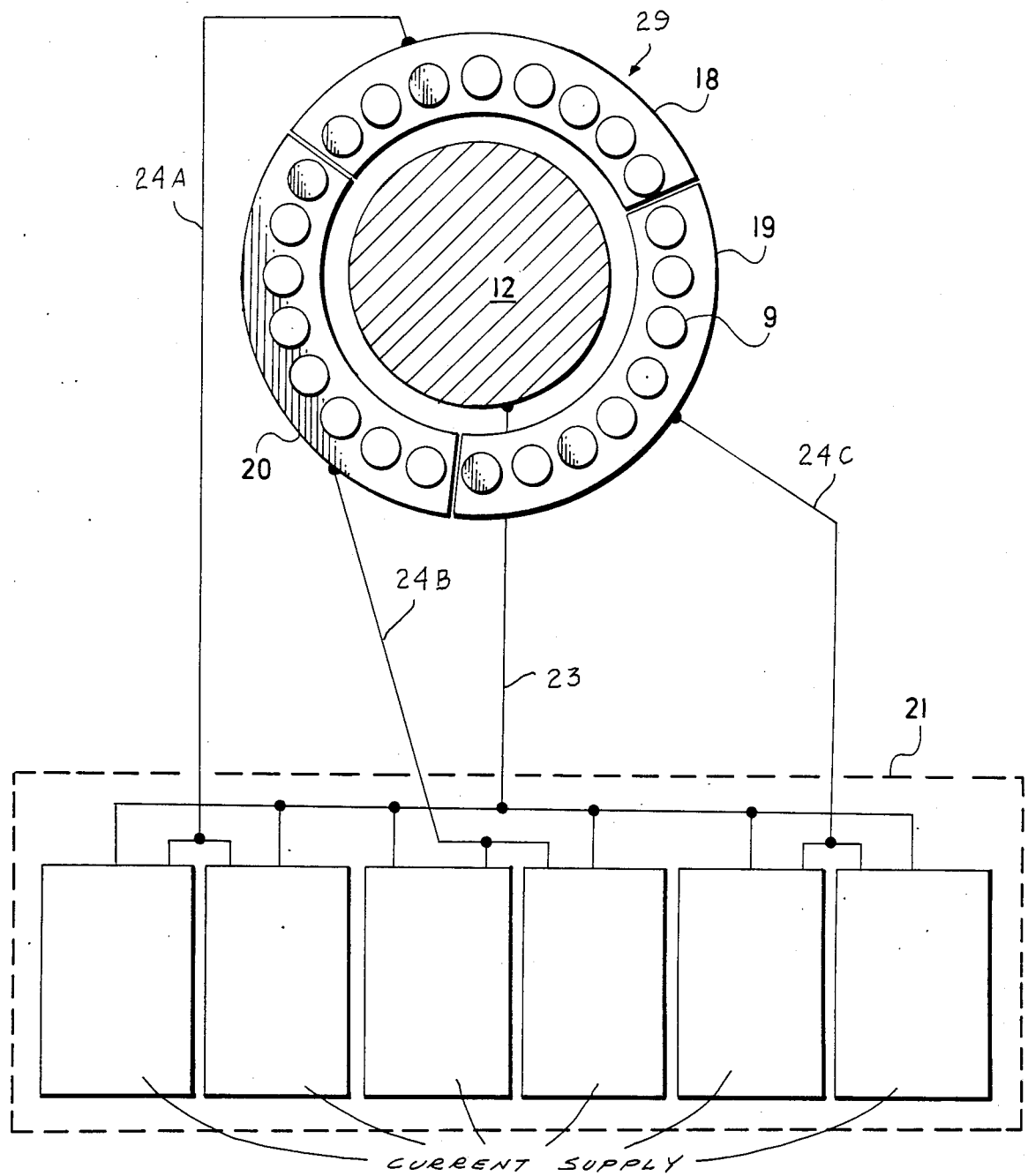
Figure 3:
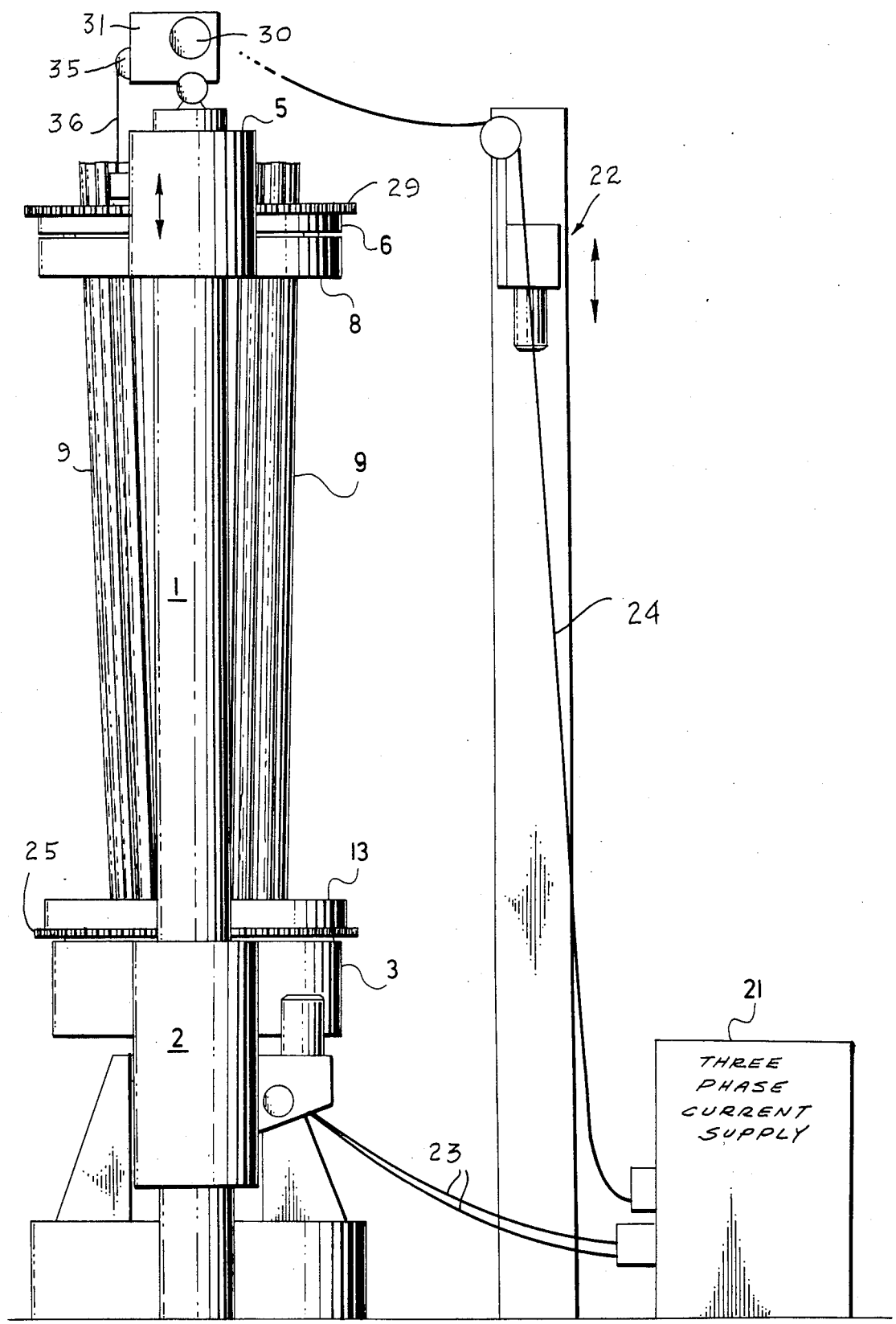

The invention will be more readily understood upon consideration of the accompanying drawings, in which:

FIG. 1 is a view partially in side elevation and partially in vertical section of a preferred embodiment of electroslag surfacing equipment in accordance with the invention, the equipment being shown with the parts thereof in the positions which they assume at the beginning of the roll surfacing operation;

FIG. 2 is a view showing in plan the three-part top bus bar connected with the upper ends of the electrodes, the roll being surfaced being shown in horizontal cross section, and the source of welding current and the cables connecting such source to the equipment being shown schematically; and, FIG. 3 is a view in end elevation of the equipment of FIG. 1 in combination with attendant equipment such as a source of welding current for the equipment and means for guiding the welding cables leading from such source of the equipment.

Turning first to FIG. 1, the equipment includes one or more supports 1 (two shown) in form of vertical circular cylindrical columns. On the columns 1 there is mounted a lower platform 2 which is mounted for travel in up and down directions along the supports. The lower platform or carriage 2 carries a crystallizer 4; lower platform 2 can at the same time serve as a support for the controls of the device. Crystallizer 4 is fixed around a vertically positioned roll 12 being surfaced, and serves for the formation and holding of a pool 15 of weld metal during the electroslag surfacing of the roll; the crystallizer also serves to shape the deposited weld overlay 14 on the roll.

Above the lower platform or carriage 2 there is vertically movably mounted on supports 1 an upper platform or carriage 5, likewise located around the roll 12 being surfaced. A swivel plate 6 equipped with rollers 7 (one shown) on the bottom rests on the upper surface of an annular member 8 formed on the upper platform or carriage 5, the swivel plate 6 rotating upon the platform 5 around the roll 12. On the upper platform or carriage 5 there are provided holders 11 which fix the upper ends of welding electrodes 9 with respect to the platform 5. The platform 5 moves downwardly to feed the welding electrodes 9 to the weld gap which is supported by a rotatable sleeve 3. The holders 11 keep the electrodes 9, at the beginning of the electroslag operation, in an oblique position (along the surface of an imaginary frustum of a cone) in which they converge at least slightly in a downward direction with respect to the axis of the roll 12; the electrodes 9 gradually approach a vertical position during their melting down as the lower platform 2 carrying with it the crystallizer 4, moves upwardly along the roll 12.

Rotatably attached to the crystallizer 4 is provided a guiding mechanism 13 for guiding the welding electrodes 9 into the welding gap. Mechanism 13 rotates around the axis of the roll 12 at the same speed and direction at the swivel plate, and is insulated from the crystallizer 4. Mechanism 13 has a ring gear 25 mounted thereon, and meshing with ring gear 2 is a pinion 26 mounted on the output shaft of a reversible electric gear motor 27.

The lower platform or carriage 2, the upper platform or carriage 5, and the swivel plate 6 surround the roll 12, the axis of rotation of the swivel plate 6 being parallel with the longitudinal axis of the roll 12. The swivel plate 6, with electrodes, rotates to provide a high-quality deposit and is driven in selective forward and reverse directions upon the angular support 8 by a reversible electric gear motor 16. The drive shaft of motor 16 bears a pinion 17 which is in mesh with a ring gear 29 fixedly attached to the swivel plate 6 which bears the welding electrodes 9. As noted above, fixing mechanisms with holders 11 are located on the inner perimeter of the swivel plate 6 at suitable distances, and electrodes 9 are connected by cables to the respective first bus bar 18 (FIG. 2), second bus bar 19, and third bus bar 20.

The bus bars are separated from and/or insulated from each other as shown, and are connected to respective phases of a three-phase welding current supply 21. The bus bars, which are of partannular shape, are fixed on the upper platform or carriage 5.

As shown in FIGS. 2 and 3, a first set of welding current bearing cables 23 are connected between the common terminal side of the current source 21 and the roll 12. A second set of welding supplying cables, of which one is shown as 10a–10c in FIG. 2, runs over a vertically reciprocal cable guide 22 and are then led to the respective one of the bus bars 18, 19, and 20.

The upper platform 5 is selectively lowered and raised by the mechanism as shown at the top of FIGS. 1 and 3. A reversible electric motor 30 and a gear box 31 are mounted upon a frame which is supported upon the upper ends of the supports 1. The frame upon which the motor 30 and gear box 31 are mounted includes a tube 32 through which there extends a shaft 34. The shaft 34 is selectively driven in opposite directions by the motor 30, the output shaft of which is connected to the input of the gear box 31. On the opposite ends of shaft 34 are mounted drums 35, upon which wires or flexible cables 36 are wound. The lower ends of cables 36 are connected to bracket 37 affixed to the outer ends of the upper platform 5. It is thus apparent that the weight of the platform 5 and the parts connected thereto including the electrodes 9 is borne by the flexible cables 36, and that all of such members may be raised or lowered as required by energizing the motor 30 to drive the platform 5 in the appropriate vertical direction.

The lower platform 2 is raised and lowered by a different mechanism, as shown in FIGS. 1 and 3. the lower platform 2 is driven by an electric motor, through cooperation with gear boxes through a toothed wheel and rack (not shown).

The above-described apparatus operates as follows:

With the upper platform 5 raised to its uppermost position and with power from the current source 21 cut off, the lower platform 2 is lowered so that a roll 12 to be surfaced can be mounted with its lower trunnion in a support in the nature of a jaw chuck as shown in FIGS. 1 and 2. The lower platform 2 is then raised to bring it into the position shown in FIG. 1 and 3 and is then secured there. Powder flux is then loaded in the crystallizer to form an annular body thereof surrounding the lower end of the roll which is to be surfaced. A plurality of electrodes 9 are then mounted in the bus bars and the fixing mechanism 11 on the upper platform 5, the electrodes being secured with their lower ends extending into the welding flux in the crystallizer. Power from the source 21 of welding current is then directed through the cables 23 and 24 to the roll 12 at the upper ends of the electrodes 9, respectively, whereby the welding flux is melted and an arc is formed through the welding flux between the lower ends of the electrodes 9 and the surface of the roll 12. The motors 16 and 27 are energized to rotate the electrodes and the crystallizer in appropriate direction around the roll. As the lower ends of the electrodes 9 are melted the lower platform 2 is gradually raised whereby the zone of deposition of metal upon the roll 12 progressively rises until the entire active operating surface of the roll has been covered.

In a preferred embodiment, the roll body is placed in a vertical position. Electrode metal is deposited into the gap formed between the roll body and the crystallizer, beginning in the lower part of the roll body. As the slag metal pools rise, lower platform 2 and crystallizer 4 rise also. During the process, the electrodes rotate reciprocally together with guiding mechanism 13 on the crystallizer 4. The upper platform 5 moves toward the crystallizer at a rate determined by the melting rate of the electrodes.

In the above description, the upper platform 5 remains at a constant height during the welding operation and the active surface of the roll 12 is covered by progressively raising the lower platform 2. Alternately, the operation may be performed by progressively moving the lower platform 2 upwardly, while progressively moving the upper plateform 5 downwardly.

Although the invention is described and illustrated primarily with reference to a single embodiment thereof, it is to be expressly understood that the invention is in no way limited to the disclosure of such preferred embodiment but is capable of numerous modifications within the scope of the appended claims.

We claim:

1. An apparatus for electroslag surfacing of rolls, comprising
   means for holding a roll in vertical position,
   a vertically movable platform bearing a sleeve which receives the roll therewithin and carries an annular crystallizer which surrounds a surface of the roll to be surfaced, said sleeve being provided with rotatable electrode guiding means, which means are insulated relative to said crystallizer,
   means including an upper platform for supporting upper ends of a plurality of generally vertically downwardly extending electrodes forming a set surrounding the roll, the lower ends of the electrodes extending into the crystallizer, and
   means for rotating the set of electrodes about the roll during electroslag surfacing of the roll.

2. An apparatus according to claim 1, wherein the means for supporting the upper ends of the electrodes are so disposed relative to the annular crystallizer that, when the electrodes are initially mounted with their lower ends engaging into the annular crystallizer, the electrodes are disposed along an imaginary surface of a downwardly converging frustum of an imaginary cone.

3. An apparatus according to claim 1, wherein the means for supporting the upper ends of the electrodes on the upper platform comprises a swivel plate rotatably mounted upon the upper platform, said plate being coaxial with the annular crystallizer, and comprising means for rotating said plate and the electrodes mounted thereon about the common axis of the plate and the crystallizer.

4. An apparatus according to claim 3, further comprising an annular, three equi-part bus bar mounted upon the swivel plate on the upper platform, the three parts of the bus bar being insulated from each other, a three-phase source of alternating welding current, a three-phase circuit connected to the source including cable means connecting one side of each phase of said source to a respective part of the bus bar and means for connecting the other, common side of the three phase source to the roll to be surfaced.

* * * * *

UNITED STATES PATENT AND TRADEMARK OFFICE
CERTIFICATE OF CORRECTION

PATENT NO. : 4,707,581
DATED : November 17, 1987
INVENTOR(S) : Pavol Blaskovits, et al It is certified that error appears in the above-identified patent and that said Letters Patent is hereby corrected as shown below:

On the title page, third inventor should read
-- Alojz Martisik --.

Signed and Sealed this

First Day of March, 1988

Attest:

DONALD J. QUIGG

Attesting Officer

Commissioner of Patents and Trademarks